US012550115B2

(12) United States Patent
Pan et al.

(10) Patent No.: US 12,550,115 B2
(45) Date of Patent: Feb. 10, 2026

(54) SYSTEMS AND METHODS FOR INDICATING UPLINK INFORMATION

(71) Applicant: ZTE Corporation, Guangdong (CN)

(72) Inventors: Yu Pan, Shenzhen (CN); Guozeng Zheng, Shenzhen (CN); Chuangxin Jiang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 124 days.

(21) Appl. No.: 18/425,631

(22) Filed: Jan. 29, 2024

(65) Prior Publication Data

US 2024/0276444 A1 Aug. 15, 2024

Related U.S. Application Data

(63) Continuation of application No. PCT/CN2021/110810, filed on Aug. 5, 2021.

(51) Int. Cl.
*H04W 24/10* (2009.01)
*H04L 5/00* (2006.01)
*H04W 64/00* (2009.01)

(52) U.S. Cl.
CPC ......... *H04W 64/006* (2013.01); *H04L 5/0051* (2013.01); *H04W 24/10* (2013.01)

(58) Field of Classification Search
CPC ... H04W 64/006; H04W 24/10; H04W 64/00; H04W 24/08; H04W 72/21; H04L 5/0051; G01S 5/0036; G01S 5/021; G01S 5/0236; H04B 17/252; H04B 17/254
See application file for complete search history.

(56) References Cited

U.S. PATENT DOCUMENTS

| 2020/0145955 | A1 | 5/2020 | Opshaug et al. |
| 2020/0229128 | A1 | 7/2020 | Xue et al. |
| 2024/0155550 | A1* | 5/2024 | Dai ............ G01S 13/765 |

FOREIGN PATENT DOCUMENTS

| CN | 101730222 B | * | 7/2012 |
| CN | 113170278 A | | 7/2021 |

(Continued)

OTHER PUBLICATIONS

Extended European Search Report for EP Appl. No. 21952293.5, dated Dec. 4, 2024 (10 pages).

(Continued)

*Primary Examiner* — Chuong A Ngo
(74) *Attorney, Agent, or Firm* — Foley & Lardner LLP

(57) ABSTRACT

Systems and methods for wireless communication systems are disclosed. In one aspect, the wireless communication method includes receiving, by a wireless communication device from a network, a positioning request. The positioning request includes a request for at least one of performing an UL-TDOA positioning method, performing multi-RTT positioning method, performing DL-TDOA positioning method, performing DL-AoD positioning method, performing UL-AoA positioning method, or reporting measurement information. The method includes reporting, by the wireless communication device to the network, the measurement information, wherein the measurement information comprises at least one of UL-TDOA measurement result, multi-RTT measurement result, DL-TDOA measurement result, DL-AoD measurement result, UL-AoA measurement result, SRS resource ID, SRS resource set ID, UE Tx TEG ID, association relationship between SRS signaling and UE Tx TEGs, or ARP information of SRS signaling. The SRS signaling comprises at least one of the following: SRS resources, or SRS resource sets.

12 Claims, 7 Drawing Sheets

(56) References Cited

FOREIGN PATENT DOCUMENTS

| EP | 4 285 659 A1 | 12/2023 |
|---|---|---|
| EP | 4 311 324 A1 | 1/2024 |
| EP | 4 331 288 A1 | 3/2024 |
| WO | WO-2020/146739 A1 | 7/2020 |
| WO | WO-2021/096322 A1 | 5/2021 |
| WO | WO-2022/205423 A1 | 10/2022 |
| WO | WO-2022/227030 A1 | 11/2022 |

OTHER PUBLICATIONS

Intel Corporation, "Mitigation of UE RX/TX and gNB RX/TX Timing Errors", 3GPP TSG RAN WG1 #104bis-e, R1-2103035, Apr. 20, 2021, e-Meeting (13 pages).

Notice of Reasons for Refusal for JP Appl. No. 2024-506660, dated Feb. 18, 2025 (with English translation, 6 pages).

Qualcomm Incorporated, "Enhancements on Timing Error Mitigations for improved Accuracy", 3GPP TSG RAN WG1 #104b-e, R1-2104671, May 27, 2021, e-Meeting (22 pages).

ZTE, "Positioning accuracy improvement by mitigating timing delay", 3GPP TSG RAN WG1 Meeting #104b-e, R1-2102668, Apr. 20, 2021, e-Meeting (12 pages).

Intel Corporation et al., "Running CR for the introduction of NR positioning" 3GPP TSG-RAN WG2 Meeting #109 electronic, R2-2000473, Mar. 6, 2020, Elbonia (71 pages).

International Search Report and Written Opinion for PCT Appl. No. PCT/CN2021/0110810, mailed Apr. 29, 2022 (8 pages).

Communication pursuant to Article 94(3) EPC for EP Appl. No. 21952293.5, dated Oct. 21, 2025 (8 pages).

\* cited by examiner

SYSTEMS AND METHODS FOR INDICATING UPLINK INFORMATION

CROSS-REFERENCE TO RELATED APPLICATION

This application claims the benefit of priority under 35 U.S.C. § 120 as a continuation of International Patent Application No. PCT/CN2021/110810, filed on Aug. 5, 2021, the disclosure of which is incorporated herein by reference in its entirety.

TECHNICAL FIELD

The disclosure relates generally to wireless communication, including but not limited to systems and methods for indicating uplink information.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions (NFs), have been simplified with some of them being software based so that they could be adapted according to need.

SUMMARY

In one aspect, a wireless communication method includes receiving, by a wireless communication device from a network, a positioning request. The positioning request includes a request for at least one of performing an Uplink Time Difference of Arrival (UL-TDOA) positioning method, performing multi-Round-Trip Time (RTT) positioning method, performing Downlink Time Difference of Arrival (DL-TDOA) positioning method, performing Downlink Angle of Departure (DL-AoD) positioning method, performing Uplink Angle of Arrival (UL-AoA) positioning method, or reporting measurement information. The method includes reporting, by the wireless communication device to the network, the measurement information. The measurement information includes at least one of UL-TDOA measurement result, multi-RTT measurement result, DL-TDOA measurement result, DL-AoD measurement result, UL-AoA measurement result, Sounding Reference Signal (SRS) resource Identifier (ID), SRS resource set ID, UE Transmission (Tx) Timing Error Group (TEG) ID, association relationship between SRS signaling and UE Tx TEGs, or Antenna Reference Point (ARP) information of SRS signaling. The SRS signaling includes at least one of the following: SRS resources, or SRS resource sets.

In some embodiments, the network includes a base station and a Location Management Function (LMF), the positioning request is configured by the base station, and the method further includes reporting, by the wireless communication device to the base station, the measurement information in at least one of a measurement report, an Uplink Control Information (UCI), a Channel State Information (CSI) feedback, or an PUCCH resource.

In some embodiments, the network includes a base station and a LMF, the positioning request is configured by the LMF. The method further includes reporting, by the wireless communication device to the LMF, the measurement information in at least one of an UL-TDOA report, a multi-RTT report, a DL-TDOA report.

In some embodiments, the LMF requests the base station to configure the positioning request.

In some embodiments, the positioning request includes a period of reporting measurement information.

In some embodiments, the method further includes in response to determining that the positioning request or the period of reporting measurement information is not received by the wireless communication device, determining, by the wireless communication device, that the period of reporting the measurement information is same as a period of reporting configuration.

In some embodiments, the reporting configuration includes at least one of a measurement report, an UCI, a CSI feedback, a Physical Uplink Control Channel (PUCCH) resource, an UL-TDOA report, a multi-RTT report, a DL-TDOA report.

In some embodiments, the method further includes in response to determining that the positioning request or the period of reporting measurement information is not received by the wireless communication device, determining, by the wireless communication device, that the period of reporting the measurement information is a subset of a period of reporting configuration.

In some embodiments, the reporting configuration includes at least one of a measurement report, an UCI, a CSI feedback, a PUCCH resource, an UL-TDOA report, a multi-RTT report, a DL-TDOA report.

In some embodiments, reporting the measurement information includes reporting the association relationship between the SRS signaling and the UE Tx TEGs using a bitmap.

In some embodiments, the association relationship between the SRS signaling and UE Tx TEGs in a first period of reporting the measurement information is same as the association relationship between the SRS signaling and UE Tx TEGs in a second period of reporting the measurement information. The SRS signaling are not transmitted in the first period of reporting the measurement information, and the SRS signaling are transmitted in the second period of reporting the measurement information. The second period of reporting the measurement information is a latest period before the first period of reporting the measurement information.

In some embodiments, UE Tx TEGs associated with the SRS signaling in a third period are default UE Tx TEGs, and the SRS signaling are not transmitted in the third period of reporting the measurement information.

In some embodiments, the measurement information further includes an indication. The indication indicates whether a transmit timing of a UE Reception-Transmission (Rx-Tx) time difference measurement is based on a transmit timing of an uplink subframe that is closest in time to a downlink subframe received from the network or a transmit timing of an uplink subframe in which one or more associated SRS signaling are transmitted.

In some embodiments, the multi-RTT measurement result includes at least one of one or more serving cell index of an associated SRS signaling, one or more SRS resource IDs, one or more SRS resource set IDs, one or more UE Tx TEG IDs, one or more timestamps associated with the SRS resource ID, or one or more timing quality of the transmit timing.

In some embodiments, the DL-TDOA measurement result includes one timestamp per cell pair being applied to two Reference Signal Time Difference (RSTD) measurements associating with a same Positioning Reference Signal (PRS) resource.

In some embodiments, the DL-TDOA measurement result includes one or more RSTD measurements, a maximum number of the RSTD measurements for each pair of cell is greater than 4.

In some embodiments, an associated PRS resource ID or PRS resource set ID is not required to be reported, and the DL-TDOA measurement result, the multi-RTT measurement result or the DL-AoD measurement result includes ARP information corresponding to the associated PRS resource or associated PRS resource set.

Another aspect is a wireless communication apparatus including at least one processor and a memory, the at least one processor is configured to read code from the memory and implement a wireless communication method. The wireless communication method includes receiving, by a wireless communication device from a network, a positioning request. The positioning request includes a request for at least one of performing an UL-TDOA positioning method, performing multi-RTT positioning method, performing DL-TDOA positioning method, performing DL-AoD positioning method, performing UL-AoA positioning method, or reporting measurement information. The method includes reporting, by the wireless communication device to the network, the measurement information. The measurement information includes at least one of UL-TDOA measurement result, multi-RTT measurement result, DL-TDOA measurement result, DL-AoD measurement result, UL-AoA measurement result, SRS resource ID, SRS resource set ID, UE Tx TEG ID, association relationship between SRS signaling and UE Tx TEGs, or ARP information of SRS signaling. The SRS signaling includes at least one of the following: SRS resources, or SRS resource sets.

Another aspect is a computer program product including a computer-readable program medium code stored thereupon, the code, when executed by at least one processor, causing the at least one processor to implement a wireless communication method. The wireless communication method includes receiving, by a wireless communication device from a network, a positioning request. The positioning request includes a request for at least one of performing an UL-TDOA positioning method, performing multi-RTT positioning method, performing DL-TDOA positioning method, performing DL-AoD positioning method, performing UL-AoA positioning method, or reporting measurement information. The method includes reporting, by the wireless communication device to the network, the measurement information. The measurement information includes at least one of UL-TDOA measurement result, multi-RTT measurement result, DL-TDOA measurement result, DL-AoD measurement result, UL-AoA measurement result, SRS resource ID, SRS resource set ID, UE Tx TEG ID, association relationship between SRS signaling and UE Tx TEGs, or ARP information of SRS signaling. The SRS signaling includes at least one of the following: SRS resources, or SRS resource sets.

Another aspect is a wireless communication method including sending, by a network to a wireless communication device, a positioning request. The positioning request includes a request for at least one of performing an UL-TDOA positioning method, performing multi-RTT positioning method, performing DL-TDOA positioning method, performing DL-AoD positioning method, performing UL-AoA positioning method, or reporting measurement information. The method also includes receiving, by the network from the wireless communication device, the measurement information. The measurement information includes at least one of UL-TDOA measurement result, multi-RTT measurement result, DL-TDOA measurement result, DL-AoD measurement result, UL-AoA measurement result, SRS resource ID, SRS resource set ID, UE Tx TEG Identifier, association relationship between SRS signaling and UE Tx TEGs, or ARP information of SRS signaling. The SRS signaling includes at least one of the following: SRS resources, or SRS resource sets.

In some embodiments, the network includes a base station and a LMF, the positioning request is configured by the base station. The method further includes receiving, by the base station from the wireless communication device, the measurement information in at least one of a measurement report, an UCI, a CSI feedback, or an PUCCH resource.

In some embodiments, the LMF requests the base station to configure the positioning request.

In some embodiments, the network includes a base station and a LMF, the positioning request is configured by the LMF. The method further includes receiving, by the LMF from the wireless communication device, the measurement information in at least one of an UL-TDOA report, a multi-RTT report, a DL-TDOA report.

In some embodiments, the network includes a base station and a LMF, sending, by the base station to the LMF, SRS coordinate information when a first condition satisfies. The SRS coordinate information includes at least one of a SRS coordinate, SRS ARP information, or SRS antenna panel information.

In some embodiments, the first condition includes at least one of: receiving beam information associated with positioning measurement is not reported by the base station; SRS signaling associated with the positioning measurement is Quasi Co-located (QCLed) with PRS resource or Synchronization Signal Block (SSB) resource, and the PRS resource or the SSB resource is not configured with geographical coordinate; or receiving beam information associated with the positioning measurement is not reported by the base station, and SRS signaling associated with the positioning measurement is not configured with spatial relation information.

In some embodiments, the method further includes determining, by the network according to a UE capability report, that a transmit timing of a UE Rx-Tx time difference measurement is based on a transmit timing of an uplink subframe in which one or more associated SRS resources are transmitted.

In some embodiments, the UE capability report includes at least one of an indication that the wireless communication device supports TEG, or an indication that the wireless communication device supports determining the transmit timing of the UE Rx-Tx time difference measurement according to the transmit timing of the uplink subframe in which the one or more associated SRS resources are transmitted.

Another aspect is a wireless communication apparatus including at least one processor and a memory. The at least one processor is configured to read code from the memory and implement a wireless communication method. The wireless communication method includes sending, by a network to a wireless communication device, a positioning request. The positioning request includes a request for at least one of performing an UL-TDOA positioning method, performing multi-RTT positioning method, performing DL- TDOA positioning method, performing DL-AoD positioning method, performing UL-AoA positioning method, or reporting measurement information. The method also includes receiving, by the network from the wireless communication device, the measurement information. The measurement information includes at least one of UL-TDOA measurement result, multi-RTT measurement result, DL-TDOA measurement result, DL-AoD measurement result, UL-AoA measurement result, SRS resource ID, SRS resource set ID, UE Tx TEG Identifier, association relationship between SRS signaling and UE Tx TEGs, or ARP information of SRS signaling. The SRS signaling includes at least one of the following: SRS resources, or SRS resource sets.

Another aspect is a computer program product including a computer-readable program medium code stored thereupon, the code, when executed by at least one processor, causing the at least one processor to implement a wireless communication method. The wireless communication method includes sending, by a network to a wireless communication device, a positioning request. The positioning request includes a request for at least one of performing an UL-TDOA positioning method, performing multi-RTT positioning method, performing DL-TDOA positioning method, performing DL-AoD positioning method, performing UL-AoA positioning method, or reporting measurement information. The method also includes receiving, by the network from the wireless communication device, the measurement information. The measurement information includes at least one of UL-TDOA measurement result, multi-RTT measurement result, DL-TDOA measurement result, DL-AoD measurement result, UL-AoA measurement result, SRS resource ID, SRS resource set ID, UE Tx TEG Identifier, association relationship between SRS signaling and UE Tx TEGs, or ARP information of SRS signaling. The SRS signaling includes at least one of the following: SRS resources, or SRS resource sets.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Mobile Communication Technology and Environment

Figure 1:
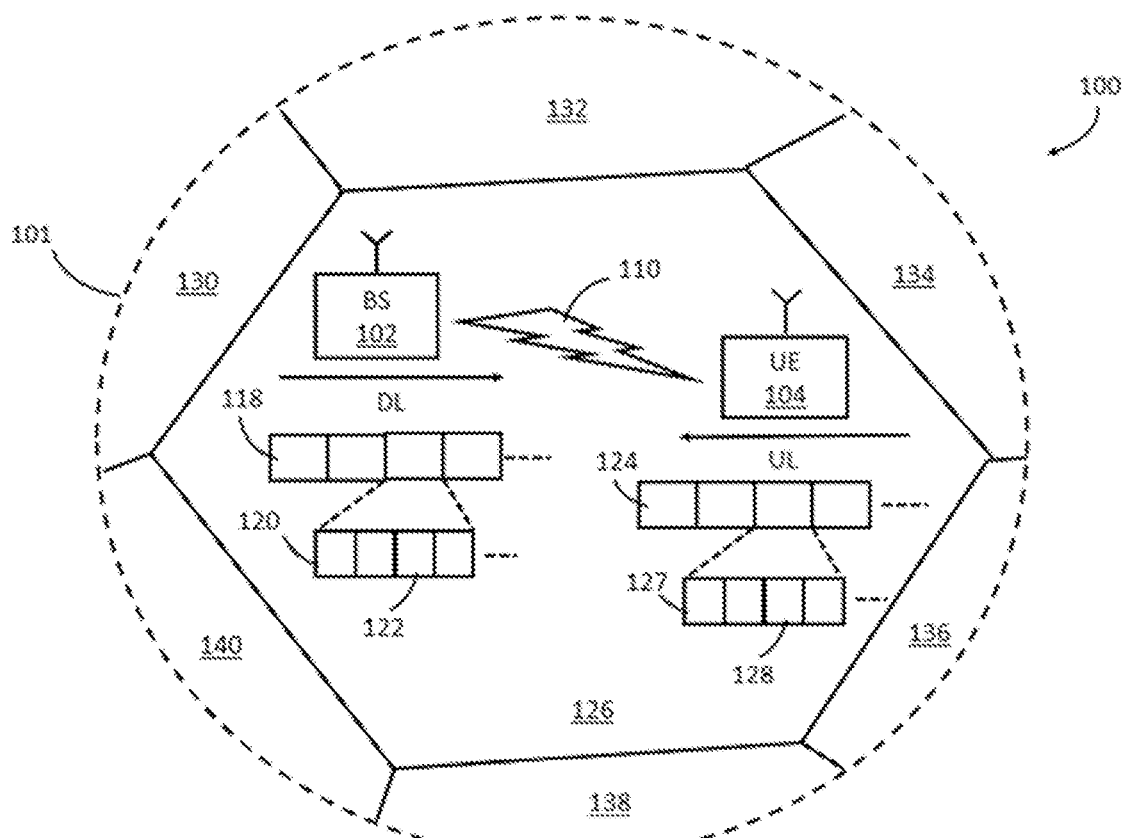
FIG. 1 illustrates an example wireless communication system in which techniques disclosed herein can be implemented, in accordance with some embodiments of the present disclosure.

FIG. 1 illustrates an example wireless communication system 100 in which techniques disclosed herein can be implemented, in accordance with some embodiments of the present disclosure. In the following discussion, the wireless communication system 100 may implement any wireless network, such as a cellular network or a narrowband Internet of things (NB-IoT) network. Such an example system 100 includes a base station (BS) 102 (also referred to as a wireless communication node) and UE 104 (also referred to as a wireless communication device) that can communicate with each other via a communication link 110 (e.g., a wireless communication channel), and a cluster of cells 126, 130, 132, 134, 136, 138 and 140 overlaying a geographical area 101. In some examples, a network refers to one or more BSs (e.g., the BS 102) in communication with the UE 104, as well as backend entities and functions (e.g., a LMF). In other words, the network refers to components of the system 100 other than the UE 104. In FIG. 1, the BS 102 and UE 104 are included within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
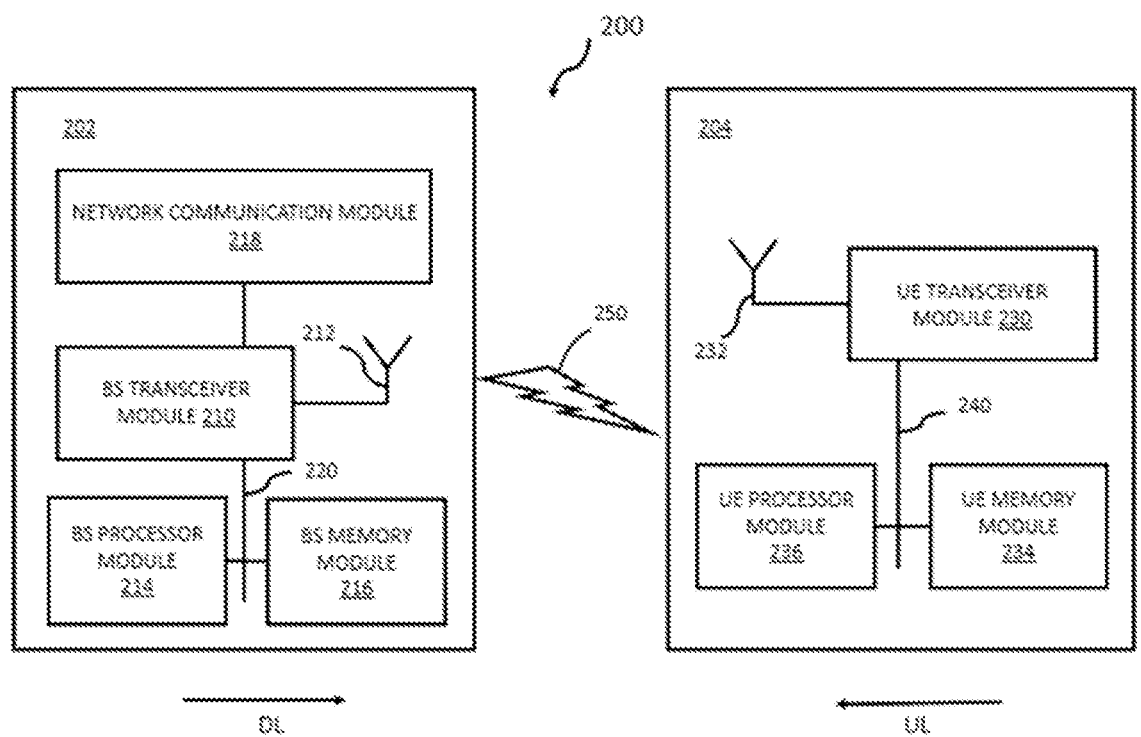
FIG. 2 illustrates a block diagram of an example wireless communication system for transmitting and receiving wireless communication signals (e.g., orthogonal frequency-division multiplexing (OFDM) or orthogonal frequency-division multiple access (OFDMA) signals) in accordance with some embodiments of the present disclosure.
Figure 3:
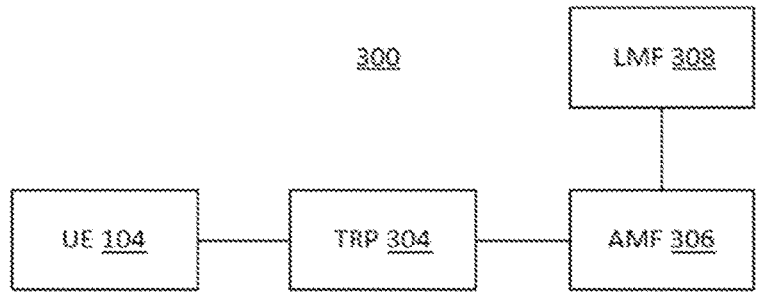
FIG. 3 illustrates a high-level schematic of a 5G core positioning architecture for NG-RAN in accordance with some embodiments of the present disclosure.

FIG. 2 illustrates a block diagram of an example wireless communication system 200 for transmitting and receiving wireless communication signals (e.g., OFDM or OFDMA signals) in accordance with some embodiments of the present disclosure. The system 200 may include components and elements configured to support known or conventional operating features that need not be described in detail herein. In one illustrative embodiment, system 200 can be used to communicate (e.g., transmit and receive) data symbols in a wireless communication environment such as the system 100 of FIG. 1, as described above.

System 200 generally includes a base station 202 (hereinafter "BS 202") and a user equipment device 204 (hereinafter "UE 204"). The BS 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each including circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each including circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a MAC layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Timing Delays and/or Timing Errors

There can be timing delays or timing errors between the baseband and antenna at the TRP and/or UE side, which perturb the measurement results in timing-based positioning method. There are timing error groups in which the measurements or signals have the same or similar timing delays or timing errors. Accordingly, there is a need for the timing errors/delays to be measured or cancelled to acquire more measurement accuracy. And there is also a need for reporting and/or indicating relative relationship(s) about timing error groups when the timing errors and/or timing error groups exist.

In NR, the positioning methods are discussed to provide UE the precise location information. In time-based positioning methods, such as DL/UL-TDOA and multi-RTT methods, there are timing error groups in which the measurements or signals have the same timing delays or timing errors. In the UL-TDOA method, there is no UL measurement result reporting procedure. Accordingly, there is a need to report UL SRS resources associated with UE Tx TEGs to the network to mitigate timing errors.

The Rx/Tx timing delay between the baseband and RF chains may be embedded in the timing measurement, since the time point is recorded at the baseband while the time duration to be measured for positioning, e.g., propagation time, is cut off at the antenna side both in TRP and UE. In this disclosure, the term "timing delay" may be interchangeable with "timing error," "transmission delay," "transmission error," "group delay" or "group error." In this disclosure, the "TRP" can be called the "gNB", "eNB", "NG-RAN node" or the "base station."

A TEG is a group of UL/DL positioning signals or DL/UL measurements which have the same timing error, or have timing errors within a certain margin. A Tx TEG can include the sending positioning signals in the group have the same Tx timing error or have the timing errors within a certain margin. A Rx TEG can include the UL or DL measurements in the group have the same Rx timing error or have the timing errors within a certain margin. A TRP may include multiple Tx TEGs and/or multiple Rx TEGs. A UE may include multiple Tx TEGs and/or multiple Rx TEGs.

For example, the TEG can be divided according to the dimension of frequency layer, beam (spatial transmission filter), and/or panel (RF chain, antennas, antenna reference point). For example, the PRS resources or PRS resource sets in a frequency layer, with a sending beam, on one of the panel are within one TRP Tx TEG. The PRS resources or PRS resource sets in another frequency layer, with a same sending beam, on the same panel may be within another TRP Tx TEG.

For example, the gNB can assume (or determine) the PRS resources or PRS resource sets in a single TRP with the same configured/indicated coordinates are within one TRP Tx TEG. The gNB can assume (or determine) the UL measurements derived from SRS resources that are configured with the same coordinate PRS resources are within one TRP Rx TEG, or the gNB can assume (or determine) the UL measurements derived from SRS resources that are configured with the PRS resources, in which the PRS resources are within one TRP Tx TEG.

For a UE, the DL measurements may contain or belong to one or multiple measurement types, including RSTD measurements, RSRP measurements or Rx-Tx time difference measurements. For a TRP, the UL measurements may contain or belong to one or multiple measurement types, including RTOA measurements, RSRP measurements or Rx-Tx time difference measurements.

In this disclosure, the SRS resource can be SRS for positioning, or regular configured SRS, e.g., SRS configured with usages. The SRS resource can also be a SRS resource set. The association relationship between SRS resources and UE Tx TEGs can also be the association relationship between SRS resource sets and UE Tx TEGs.

In this disclosure, the gNB can be serving gNB or the neighbor gNB.

In this disclosure, the base station, gNB, TRP, NG-RAN node, ng-eNB, TP (transmit point) or RP (receive point) can be interchangeable.

In this disclosure, the association relationship between SRS resources/SRS resource sets and UE Tx TEGs can include the SRS resource ID/SRS resource set ID having an association relationship with the UE Tx TEG ID. For example, SRS resource 1 and SRS resource 2 can be associated with UE Tx TEG 1, SRS resource set 1 can be associated with UE Tx TEG 2, etc.

In some arrangements, the network requires the UE to report SRS ID, measurement results of each SRS and the association relationship between SRS and TX TEG.

In some embodiments, in the UL-TDOA method or multi-RTT positioning method, the LMF or gNB may request the UE to report the at least one of the following measurement information: SRS resource ID, SRS resource set ID, UE Tx TEG ID, the association relationship between SRS resources and UE Tx TEGs, the association between SRS resource set and UE Tx TEGs. The association relationship mentioned above can be based on some of the configured SRS resources/SRS resource sets, or all configured SRS resources/SRS resource sets. The LMF and gNB may also request the UE to report the measurement information in a configured period. The UE can receive the request, and the UE can transmit the measurement information to the network based on the request.

If the request comes from serving gNB, the request of reporting the measurement information mentioned above can be included in at least one of the following IEs: SRS config, MeasObjectCLI, MeasObjectCLINR, MeasConfig, CSI-ReportConfig, CSI-AperiodicTriggerStateList, PUCCH-Config, PUSCH-Config. Under this scenario, the LMF may send the request to the serving gNB. The request can be included in Requested SRS Transmission Characteristics or MEASUREMENT REQUEST IE. Serving gNB receives the request and sends SRS configuration to UE containing the request in SRS configuration IE.

If the request comes from LMF, the request of reporting the association relationship between SRSs and UE Tx TEGs can be included in at least one of the following IEs: RequestLocationInformation, NR-Multi-RTT-RequestLocationInformation-r16, NR-DL-AOD-RequestLocationInformation-r16, NR-DL-TDOA-RequestLocationInformation-r16. Alternatively, UE can report the association relationship between SRS resources and UE Tx TEGs in a new defined IE, this IE is used for UL measurement or information reporting. This IE is used for report UL-TDOA and UL-AoA measurement result, or information related to UL positioning. This IE is different from UL capability transfer IE.

Alternatively, if UE is scheduled with some positioning method like multi-RTT, DL-TDOA or UL-TDOA, UE should report the measurement information without the explicit request.

In some arrangements, in the measurement report, the UE reports the relationship between SRS and TX TEG to gNB. In UCI, the UE reports the relationship between SRS and TX TEG to gNB.

If the UE is configured with the UL-TDOA method or the multi-RTT method, the UE reports the association relationship of SRSs and UE Tx TEG in the measurement report to the serving gNB, UE can report it in at least one of the following IEs: measurementReport, MeasResults.

UE reports association relationship of SRSs and UE Tx TEG to the serving gNB in the UCI. For example, UE can report the association relationship with periodic, semi-persistent or aperiodic CSI feedback in response to the indication of the CSI-ReportConfig IE.

The UE can report the association relationship of SRSs and UE Tx TEG to the serving gNB using a specific PUCCH resource. The function of this PUCCH resource is to transmit the foregoing association relationship. Since the PUCCH resource may have different format, for example, format 0, format 1 . . . format 4, etc. The PUCCH resource used to carry the association relationship can be any format. Accordingly, the PUCCH resource which can transmit the association relationship is not restricted to a specific format. The PUCCH can be configured periodically, semi-periodically or aperiodically.

In some arrangements, the UE uses two-dimensional bitmap to report association relationship.

The UE can report the association relationship of SRSs and UE Tx TEG using a bitmap (or matrix). The SRSs and UE Tx TEGs typically has one-to-one mapping. If the bitmap is two-dimensional, in this bitmap, the row can be the SRS resource ID and the column can be the UE Tx TEG ID. For the row, the SRS resource set ID can be in the ascending (or descending) order, and in each set, the SRS resource ID in each set is in an ascending (or descending) order. Each element in this two-dimensional bitmap can be represented by one bit indicating whether the SRS resource and the UE Tx TEG is matched (associated) or not. All configured SRS resources for positioning is included in this bitmap.

The reported bitmap can also be one-dimensional by creating a vector of the two-dimensional bitmap. For example, the total number of bits in the bitmap can be the number of rows times the number of columns. For example, SRS resources are ordered in an ascending order firstly of Tx TEG ID, and secondly of the SRS resource set ID.

In some arrangements, the UE reports association periodically, and the period is configurable.

The UE can report the association relationship of SRSs and UE Tx TEG periodically to the network. The UE can be configured a period for reporting the association. The configured period for reporting the association relationship can be included in the positioning request. The configured period for reporting association relationship can be the same or similar to the period of a reporting configuration which the association relationship is reported along with. For example, the period for reporting association relationship can be a subset of the period for reporting configuration which the association relationship is reported along with. Alternatively, the configured period for reporting the association relationship of SRSs and UE Tx TEG can be any other value.

If the UE is not configured with a reporting period, or UE does not receive the positioning request, the period of reporting association relationship can be the same as the period of reporting configuration which the association relationship is reported along with by default.

The reporting configuration can be: a measuring report, an UCI, a CSI feedback, a PUCCH resource, an UL-TDOA report, a multi-RTT report, a DL-TDOA report, or a new information element report to the LMF or gNB. A measuring report refers in particular to the measurement report in RRC signaling, from UE to the serving gNB.

In some arrangements, the UE can update the association relationship bitmap in each report. In one measurement information reporting period, the SRSs which are not transmitted can keep the UE Tx TEG association relationship of the last transmitted association relationship.

Alternatively, in one measurement information reporting period, the SRSs which are not transmitted can fall back to the default UE Tx TEG. Default Tx TEG can be defined at an earlier time. Default UE Tx TEG can be any UE Tx TEG. Default UE Tx TEG can be reported to the network through UE capability, or through UE measurement report, or reported along with the association relationship to the network.

In some arrangements, the Tx timing to form the UE Rx-Tx time difference measurement is the transmit timing of uplink subframe #j that is closest in time to the downlink subframe #i received from the positioning node.

The network can determine whether UE Rx-Tx time difference measurement is based on: (a) the transmit timing of uplink subframe #j that is closest in time to the downlink subframe #i received from the positioning node; or (b) the transmit timing of uplink subframe #j that actually transmits the associated SRS resource, according to the indication in the UE positioning measurement report.

In a first method, in the multi-RTT report, a parameter indicating whether UE Rx-Tx time difference measurement is based on (a) or (b) should be reported with the measurement result, for example, in NR-Multi-RTT-SignalMeasurementInformation IE. This parameter is a Boolean value. If the network receives the value of this parameter as true, it can mean the UE Rx-Tx time difference measurement is based on (b), e.g., the transmit timing of uplink subframe #j that actually transmits the associated SRS resource.

In a second method, a parameter which reports optionally can be reported within the multi-RTT report. The parameter can be reported to indicate the UE Rx-Tx time difference measurement is based on (b). If the parameter is not reported, it can mean the UE Rx-Tx time difference measurement is based on the (a), e.g., the transmit timing of uplink subframe #j that is closest in time to the downlink subframe #i received from the positioning node.

The network can determine whether UE Rx-Tx time difference measurement is based on: (a) the transmit timing of uplink subframe #j that is closest in time to the downlink subframe #i received from the positioning node; or (b) the transmit timing of uplink subframe #j that actually transmits the associated SRS resource, according to the UE capability report.

The UE capability contains at least one of the following: whether the UE supports TEG, or whether UE supports using the transmit timing of uplink subframe #j that actually transmits the associated SRS resource to determine the UE Rx-Tx time difference measurement. If UE supports TEG or UE supports (b), network and UE determines UE Rx-Tx time difference measurement is based on (b), and vice versa.

In some arrangements, the UE can send SRSs to specific TRP according to the explicit indication of TRP information in SRS configuration or SRS request. When UL positioning or UL+DL positioning is used, the gNB may indicate to the UE which SRSs are within one specific TRP. The UE may receive one or more lists, each of them including SRS resources or SRS resource sets towards a specific TRP.

In some arrangements, Tx timing quality is reported in the multi-RTT report.

In multi-RTT report, UE can additionally report at least one of the following information: SRS resource ID, SRS resource set ID, time stamp for the reported SRS resource(s), Rx-Tx time difference measurement associated with the reported SRS resource(s), SRS antenna coordinate, relative distance between the transmitting antenna, angles of the transmitting antenna, UE Tx TEG ID, timing quality of the transmit timing, SRS RSRP result for the reported SRS resource.

In multi-RTT reporting, if a Tx TEG ID is reported, several SRS resource IDs associated with the Tx TEG ID can be reported together. Each SRS resource ID can be associated with a time stamp.

In some arrangements, if the same PRS of a TRP is received by different UE Rx TEGs simultaneously (or substantially simultaneously), 2 RSTD measurements can be associated with this same PRS resource. The 2 RSTD measurements can have the same reference timing and share the same time stamp in the DL-TDOA report. For example, the UE can report only one time stamp, which can be applied to the 2 RSTD measurements associating with the same PRS resource.

Alternatively, if the same PRS of a TRP is received by different UE Rx TEGs simultaneously (or substantially simultaneously), 2 Rx-Tx time different measurements can be associated with this same PRS resource. The 2 Rx-Tx time different measurements can share the same time stamp in the multi-RTT report. For example, the UE only reports one time stamp, this time stamp is applied to the 2 UE Rx-Tx time difference measurements associating with the same PRS resource.

In some arrangements, the maximum number of reported RSTD measurements per TRP pair is increased.

The maximum number of measured and reported RSTD measurements per TRP pair can be increased in DL-TDOA. If the same PRS of a TRP is received by different UE Rx TEGs simultaneously (or substantially simultaneously), the maximum number of additional RSTD measurements per TRP pair for DL-TDOA can be enhanced to be larger than 3. For example, the maximum number of additional RSTD measurements per TRP pair for DL-TDOA can be 7. For example, the UE may be configured to measure and report, subject to UE capability, up to X DL RSTD measurements per pair of cells with each measurement between a different pair of DL PRS resources or DL PRS resource sets within the DL PRS configured for those cells, where X is larger than 4, such as 8 or another integer.

The maximum number of measured and reported Rx-Tx time difference measurements per TRP can be increased in multi-RTT. If the same PRS of a TRP is received by different UE Rx TEGs simultaneously (or substantially simultaneously), the maximum number of additional Rx-Tx time difference measurements per TRP for multi-RTT can be enhanced to be larger than 3. For example, the maximum number of additional Rx-Tx time difference measurements in a single measurement element for multi-RTT can be 7. For example, the UE may be configured to measure and report, subject to UE capability, up to X UE Rx-Tx time difference measurements corresponding to a single configured SRS resource or resource set for positioning, where X is larger than 4, such as 8 or another integer.

The TRP pair mentioned above can also be described as pair of cells.

In some arrangements, if the PRS is configured with a different ARP, the UE reports the measurement associated ARP information.

If DL PRSs are associated with different geographical coordinates or ARPs, and PRS resource ID and/or PRS resource set ID is not reported, when reporting multi-RTT, DL-TDOA and DL-AoD measurement results, the UE can report its panel, ARP, or geographical coordinates information of receiving PRS resource or PRS resource set along with the measurement results.

Alternatively, if the DL PRS is associated with different ARPs, then the UE can report the DL-PRS Resource ID(s) or DL-PRS Resource Set ID(s).

The panel information or ARP information can be panel ID or ARP ID. If panel or ARP can be associated with the UE Rx TEG, the panel information or ARP information mentioned above can be the UE Rx TEG ID.

UE may include multiple antenna groups located in slightly different geographical coordinates. The antenna groups can be called ARP (antenna reference point). The UE may have many antenna panels to transmit SRS. ARP is similar as antenna panels. The UE can report that the ARP information corresponds to the sending SRS resource or SRS resource set. The ARP information can be reported together with the association relationship between SRS resources/SRS resource sets and UE Tx TEGs.

In some arrangements, after the conditions are met, TRP reports the received coordinate of SRS.

Each NG-RAN node can serve several TRPs, TPs or RPs. Each TRP, TP or RP may include multiple antenna groups located in slightly different geographical coordinates. The antenna groups can be called ARP. In UL-TDOA, UL-AoA or multi-RTT method, NG-RAN node can report its RSRP, RTOA or gNB Rx-Tx time difference measurement to the LMF along with the received SRS coordinate in which the SRS is associated with the measurement results, or received associated SRS ARP information, or received associated SRS panel information if at least one of the following conditions satisfied:

(1) If the LMF does not request NG-RAN node to report Measurement Beam Information, and NG-RAN node does not report Measurement Beam Information.

(2) If LMF requests NG-RAN node to report Measurement Beam Information, and NG-RAN node reports Measurement Beam Information, in which the SRS is associated with PRS resource or SSB resource; and, if the PRS resource or SSB resource is not configured with coordinate information.

(3) If the LMF does not request NG-RAN node to report Measurement Beam Information, and NG-RAN node does not report Measurement Beam Information; and SRS is not configured with QCL relationship, e.g., spatial relation info.
(4) If LMF does not request NG-RAN node to report Measurement Beam Information, and NG-RAN node does not report Measurement Beam Information; and SRS is configured with QCL relationship, in which the SRS is QCLed with PRS resource or SSB resource. However, the PRS resource or the SSB resource is not configured with coordinate information.

The panel information or ARP information can be panel ID or ARP ID. If panel or ARP can be associated with TRP Rx TEG, the panel information or ARP information mentioned above can be TRP Rx TEG ID.

For example, the NG-RAN node reports the measurement results to the LMF along with the received associated SRS coordinate, or received associated SRS ARP information, or received associated SRS panel information, can be reported in MEASUREMENT RESPONSE message, MEASUREMENT REPORT message, or MEASUREMENT UPDATE message.

Alternatively, the received associated SRS coordinate, or received associated SRS ARP information, or received associated SRS panel information, can be reported in POSITIONING INFORMATION RESPONCE message, POSITIONING INFORMATION UPDATE message, TRP INFORMATION RESPONCE message, or POSITIONING ACTIVATION RESPONCE message.

In some embodiments, after the UE sends the SRS to the TRP, the TRP can report the coordinates of the received SRS to the LMF. Both TRP and LMF belong to the network.

In some arrangements, the network indicates several indices of SRS resource or SRS resource set to the UE when the UE is configured to enter the RRC inactive state. The indices can serve as the SRS configuration used in the UE small data transmission (SDT) state.

The UE can be indicated in several indices of SRS resource or SRS resource set when UE is configured to enter the RRC inactive state. The several indices of SRS resource or SRS resource set can serve as the SRS configuration used in the UE SDT state. The indicated indices can be configured in SuspendConfig, or in RRCRelease IE, or the indicated indices can be configured in RRC signaling after SDT state is activated. The indicated indices is selected (e.g., picked up) from the latest SRS configuration in the RRC connected state before RRC inactive state.

Alternatively, the UE is configured with a SRS configuration in SuspendConfig or in RRCRelease IE, and the SRS configuration is used when UE enters SDT state.

Alternatively, the UE is configured with a SRS configuration in RRC signaling after SDT state is activated.

When the UE receives the indication of SRS to be transmitted in SDT state, the UE can transmit SRSs the same as the indication of SRS in SuspendConfig or in RRCRelease IE.

In SDT state, the UE may receive DCI and MAC-CE signaling from NG-RAN node. So the SRS that UE is indicated to transmit in SDT state can be periodic, semi-periodic or aperiodic.

In some arrangements, the network indicates indices of SRS resource or SRS resource set to the UE when UE is configured to enter the RRC inactive state, where the indices are derived from the SRS configuration in RRC connect state.

The UE can be indicated in several indices of SRS resource or SRS resource set when the UE is configured to enter the RRC inactive state. The indices of SRS resource or SRS resource set can be derived from the SRS configuration in RRC connect state. The UE can be additionally indicated part of SRS configuration which is different from the original SRS configuration of the SRS resource or SRS resource set. The original SRS configuration can mean the SRS configuration in RRC connect state. The indicated indices can be configured in SuspendConfig, or in RRCRelease IE, or the indicated indices can be configured in RRC signaling after SDT state is activated. For example, the UE can transmit SRS in SDT state or in RRC inactive state according to two parts of SRS configuration: the original SRS configuration of the indicated indices, and the additionally indicated SRS configuration. For the IEs indicated in both additional SRS configuration and original SRS configuration, the value of these IEs in the additionally indicated SRS configuration can cover the value of these IEs in the original SRS configuration. For the IEs only indicated in the additional SRS configuration, the UE can adopt the value of these IEs as the indication in the additional SRS configuration. For the IEs only indicated in the original SRS configuration, UE can adopt the value of these IEs as the indication in the original SRS configuration.

For example, if the original SRS configuration indicates that SRS resource set 1 uses pathloss reference RS as a SSB, and the additional SRS configuration indicates that the SRS resource set 1 uses pathloss reference RS as a CSI-RS, when UE transmits SRS resource set 1 in SDT state or in RRC inactive state, the UE can use pathloss reference RS as a CSI-RS.

The additional SRS configuration can be any IEs in SRS config IE.

In some arrangements, the network indicates indices of SRS resource or SRS resource set to the UE when UE is configured to enter the RRC inactive state, where the indices can serve as the SRS configuration used in the RRC inactive state.

The UE can be indicated in several indices of SRS resource or SRS resource set when UE is configured to enter the RRC inactive state, and the several indices of SRS resource or SRS resource set can serve as the SRS configuration used in the RRC inactive state. The several indices of SRS resource or SRS resource set can be picked up among the SRS configuration in the RRC connected state. The indicated indices can be configured in SuspendConfig, or in RRCRelease IE.

The UE reports whether it has the capability to transmit periodic SRS in the RRC inactive state.

The present disclosure is includes various technical solutions concerning reporting and/or indicating relative relationships about TEGs when timing errors exist.

In some embodiments, the gNB requires the UE to report: SRS resource ID, measurement results per SRS resources, the association relationship between SRSs and UE Tx TEGs, the periodicity of association relationship report.

In some embodiments, LMF may request the gNB to configure at least one of the following: the request of reporting the association relationship between SRSs and UE Tx TEGs, and the periodicity of the association relationship being reported.

In some embodiments, the UE reports the association relationship of SRSs and UE Tx TEG to the serving gNB in the measurement report.

In some embodiments, the UE reports the association relationship of SRSs and UE Tx TEG to the serving gNB in the UCI.

In some embodiments, the UE reports the association relationship of SRSs and UE Tx TEG to the serving gNB in a specific PUCCH resource.

In some embodiments, the UE can report at least following information along with the association relationship of SRSs and UE Tx TEG: timestamp for each SRS resource, SRS antenna coordinate, relative distance between antenna, angles of antenna.

In some embodiments, the UE reports the association relationship of SRSs and UE Tx TEG using a bitmap.

In some embodiments, the UE is configured with a period for reporting the association relationship of SRSs and UE Tx TEG to the network.

In some embodiments, the configured period for reporting association relationship can be the same or relative to the period of multi-RTT report.

In some embodiments, the period of CSI feedback is the same as the period of reporting the association relationship.

In some embodiments, in one period, the SRSs which are not transmitted keeps the UE Tx TEG association relationship of the last transmitted association relationship.

In some embodiments, in one period, the SRSs which are not transmitted fall back to the default UE Tx TEG.

In some embodiments, the network determines whether UE Rx-Tx time difference measurement is based on: (a) the transmit timing of uplink subframe #j that is closest in time to the downlink subframe #i received from the positioning node; (b) the transmit timing of uplink subframe #j that actually transmits the associated SRS resource; according to the indication in the UE positioning measurement report.

In some embodiments, the network determines whether UE Rx-Tx time difference measurement is based on: (a) the transmit timing of uplink subframe #j that is closest in time to the downlink subframe #i received from the positioning node; (b) the transmit timing of uplink subframe #j that actually transmits the associated SRS resource; according to the UE capability report.

In some embodiments, the UE capability contains at least one of the following: whether UE supports TEG, or whether UE supports to use the transmit timing of uplink subframe #j that actually transmits the associated SRS resource to determine the UE Rx-Tx time difference measurement.

In some embodiments, in multi-RTT report, at least one of the following should be contained: serving cell index, SRS resource ID, SRS resource set ID, UE Tx TEG ID, timing quality of the Tx timing.

In some embodiments, in multi-RTT reporting, if a Tx TEG ID is reported, several SRS resource IDs associated with the Tx TEG ID can be reported together. Each SRS resource ID is associated with a timestamp.

In some embodiments, the UE only reports one timestamp, and this timestamp is applied to the 2 RSTD measurements associating with the same PRS resource.

In some embodiments, the maximum numbers of measured and reported RSTD measurements per TRP pair in DL-TDOA are increased.

In some embodiments, the maximum numbers of measured and reported RSTD measurements per TRP pair in multi-RTT are increased.

In some embodiments, if DL PRSs are associated with different ARPs, when reporting multi-RTT and DL-TDOA results, UE reports the measurement results associated with ARP.

Figure 4:
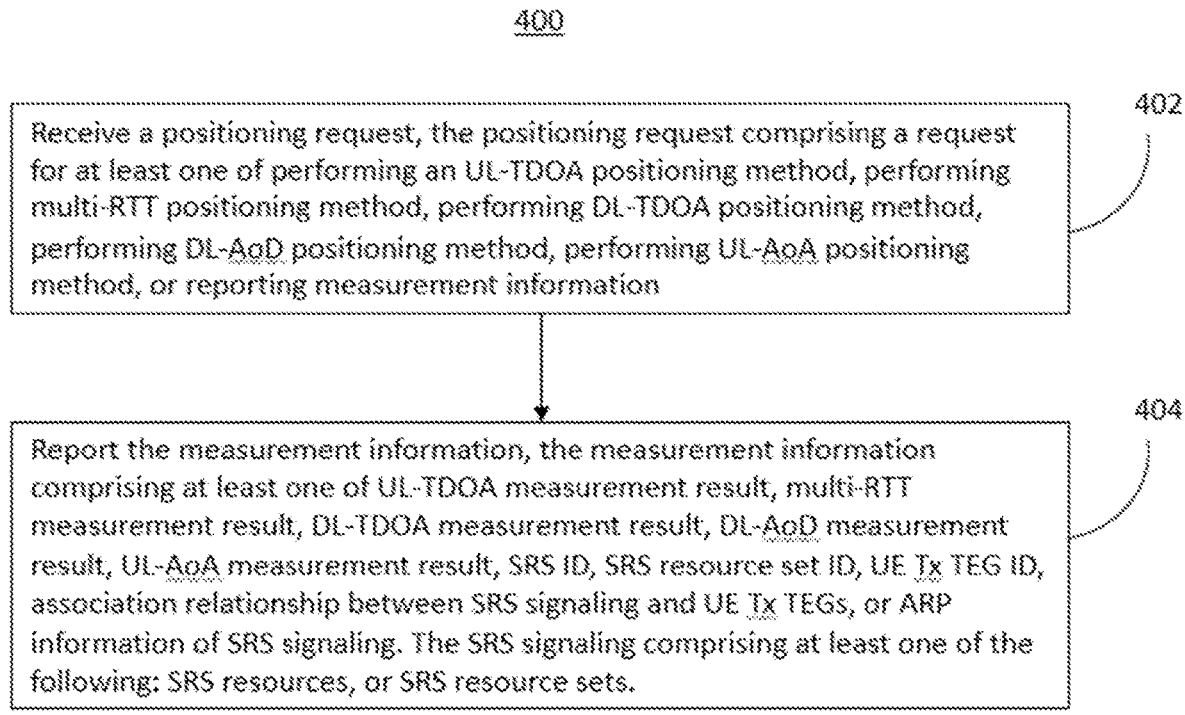
FIGS. 4, 5, 6, 7, and 8 illustrate flow charts of example wireless communication processes in accordance with some embodiments of the present disclosure.

FIG. 4 illustrates a flow chart of an example wireless communication process 400 according to some embodiments. The process 400 is performed by the UE. The process 400 includes receiving a positioning request (402). The positioning request includes a request for at least one of performing an UL-TDOA positioning method, performing multi-RTT positioning method, performing DL-TDOA positioning method, performing DL-AoD positioning method, performing UL-AoA positioning method, or reporting measurement information. The process 400 includes reporting the measurement information to the network (404). The measurement information includes at least one of UL-TDOA measurement result, multi-RTT measurement result, DL-TDOA measurement result, DL-AoD measurement result, UL-AoA measurement result, SRS resource ID, SRS resource set ID, UE Tx TEG ID, association relationship between SRS signaling and UE Tx TEGs, or ARP information of SRS signaling. The SRS signaling includes at least one of the following: SRS resources, or SRS resource sets.

In some embodiments, the UE not only reports measurement information, but the UE also reports DL-TDOA measurement results and/or multi-RTT measurement results.

Figure 5:
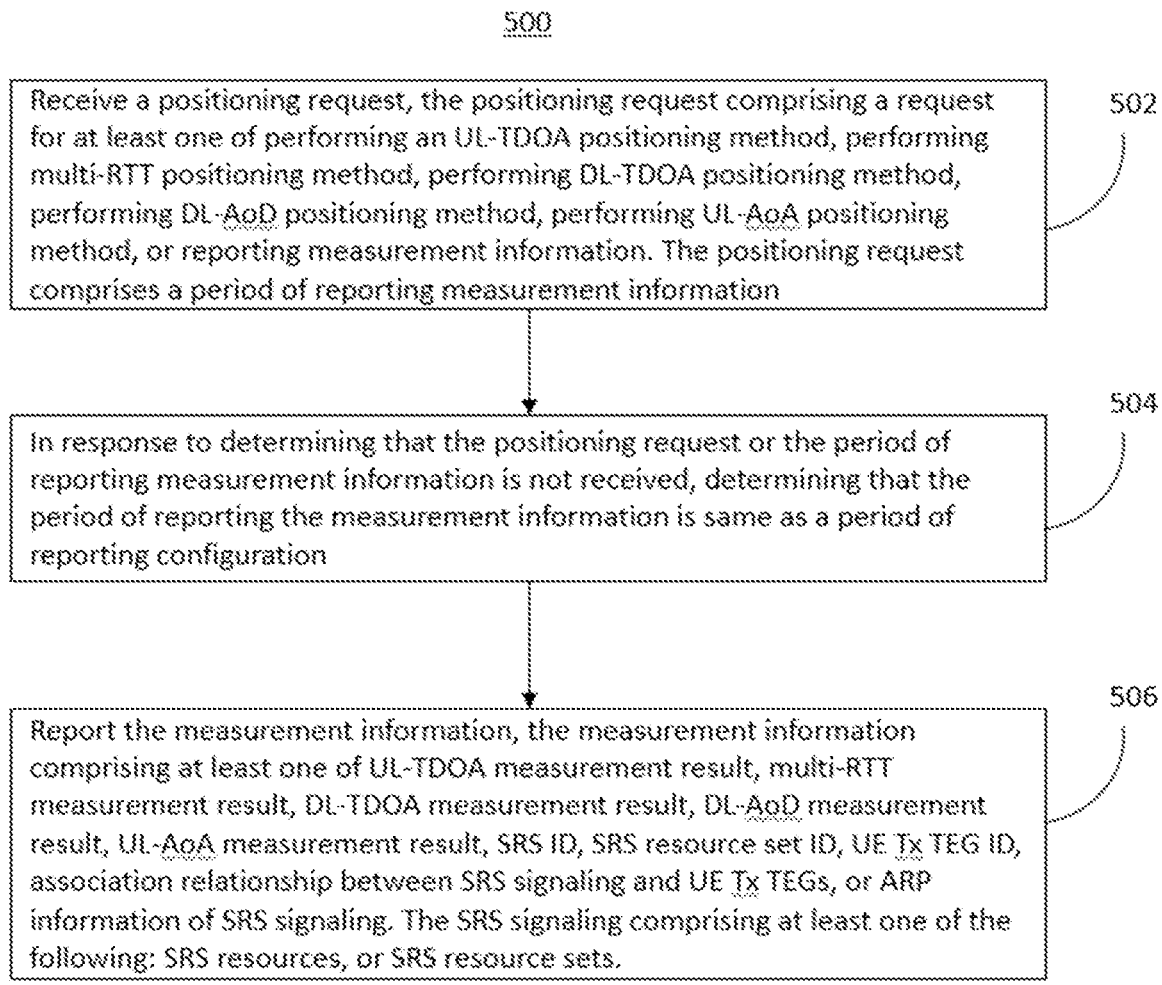

FIG. 5 illustrates a flow chart of an example wireless communication process 500 according to some embodiments. The process 500 is performed by the UE. The process 500 includes receiving a positioning request (502). The positioning request includes a request for at least one of performing an UL-TDOA positioning method, performing multi-RTT positioning method, performing DL-TDOA positioning method, performing DL-AoD positioning method, performing UL-AoA positioning method, or reporting measurement information. The positioning request includes a period of reporting measurement information. The process 500 includes in response to determining that the positioning request or the period of reporting measurement information is not received by the wireless communication device, determining that the period of reporting the measurement information is same as a period of reporting configuration (504). The process 500 includes reporting the measurement information to the network (506). The measurement information includes at least one of UL-TDOA measurement result, multi-RTT measurement result, DL-TDOA measurement result, DL-AoD measurement result, UL-AoA measurement result, SRS resource ID, SRS resource set ID, UE Tx TEG ID, association relationship between SRS signaling and UE Tx TEGs, or ARP information of SRS signaling. The SRS signaling includes at least one of the following: SRS resources, or SRS resource sets.

In some embodiments, the reporting configuration includes at least one of a measurement report, an UCI, a CSI feedback, a PUCCH resource, an UL-TDOA report, a multi-RTT report, a DL-TDOA report, or a new information element report.

Figure 6:
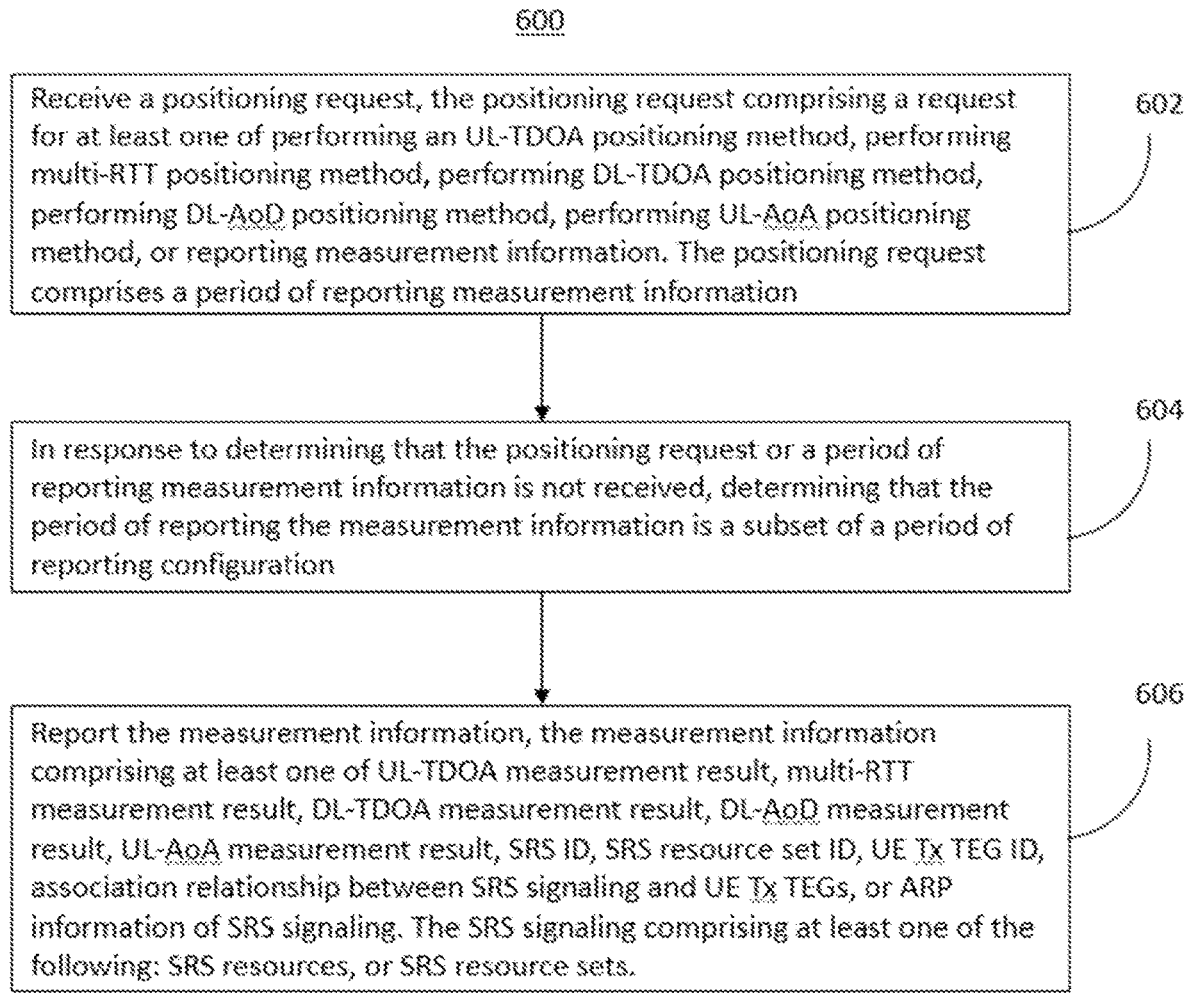

FIG. 6 illustrates a flow chart of an example wireless communication process 600 according to some embodiments. The process 600 is performed by the UE. The process 600 includes receiving a positioning request (602). The positioning request includes a request for at least one of performing an UL-TDOA positioning method, performing multi-RTT positioning method, performing DL-TDOA positioning method, performing DL-AoD positioning method, performing UL-AoA positioning method, or reporting measurement information. The positioning request includes a period of reporting measurement information. The process 600 includes in response to determining that the positioning request or the period of reporting measurement information is not received by the wireless communication device, determining, by the wireless communication device, that the period of reporting the measurement information is a subset of a period of reporting configuration (604). The process 600 includes reporting the measurement information to the network (606). The measurement information includes at least one of UL-TDOA measurement result, multi-RTT measurement result, DL-TDOA measurement result, DL-AoD measurement result, UL-AoA measurement result, SRS resource ID, SRS resource set ID, UE Tx TEG ID, association relationship between SRS signaling and UE Tx TEGs, or ARP information of SRS signaling. The SRS signaling includes at least one of the following: SRS resources, or SRS resource sets.

In some embodiments, the reporting configuration includes at least one of a measurement report, an UCI, a CSI feedback, a PUCCH resource, an UL-TDOA report, a multi-RTT report, a DL-TDOA report, or a new information element report.

Figure 7:
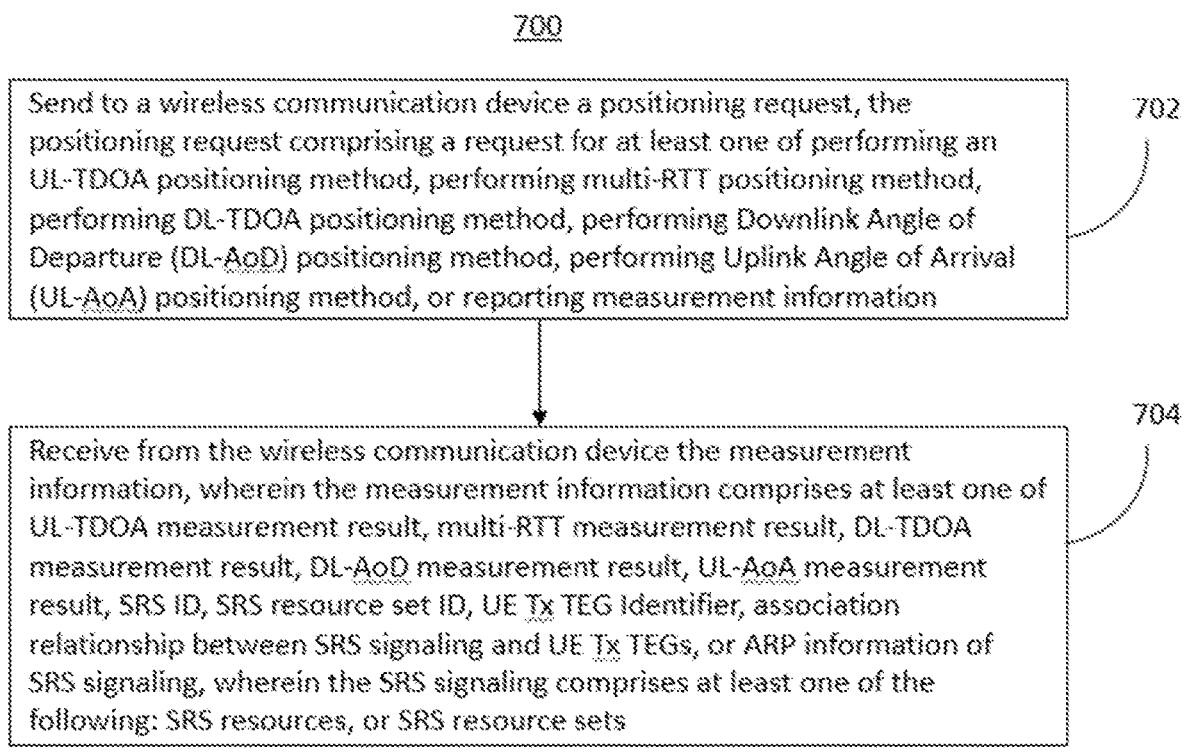

FIG. 7 illustrates a flow chart of an example wireless communication process 700, according to some embodiments. The process 700 is performed by the TRP. The process 700 includes sending to a wireless communication device a positioning request (702). The positioning request includes a request for at least one of performing an UL-TDOA positioning method, performing multi-RTT positioning method, performing DL-TDOA positioning method, performing DL-AoD positioning method, performing UL-AoA positioning method, or reporting measurement information. The process 700 also includes receiving from the wireless communication device the measurement information (704). The measurement information includes at least one of UL-TDOA measurement result, multi-RTT measurement result, DL-TDOA measurement result, DL-AoD measurement result, UL-AoA measurement result, SRS resource ID, SRS resource set ID, UE Tx TEG ID, association relationship between SRS signaling and UE Tx TEGs, or ARP information of SRS signaling. The SRS signaling includes at least one of the following: SRS resources, or SRS resource sets.

Figure 8:
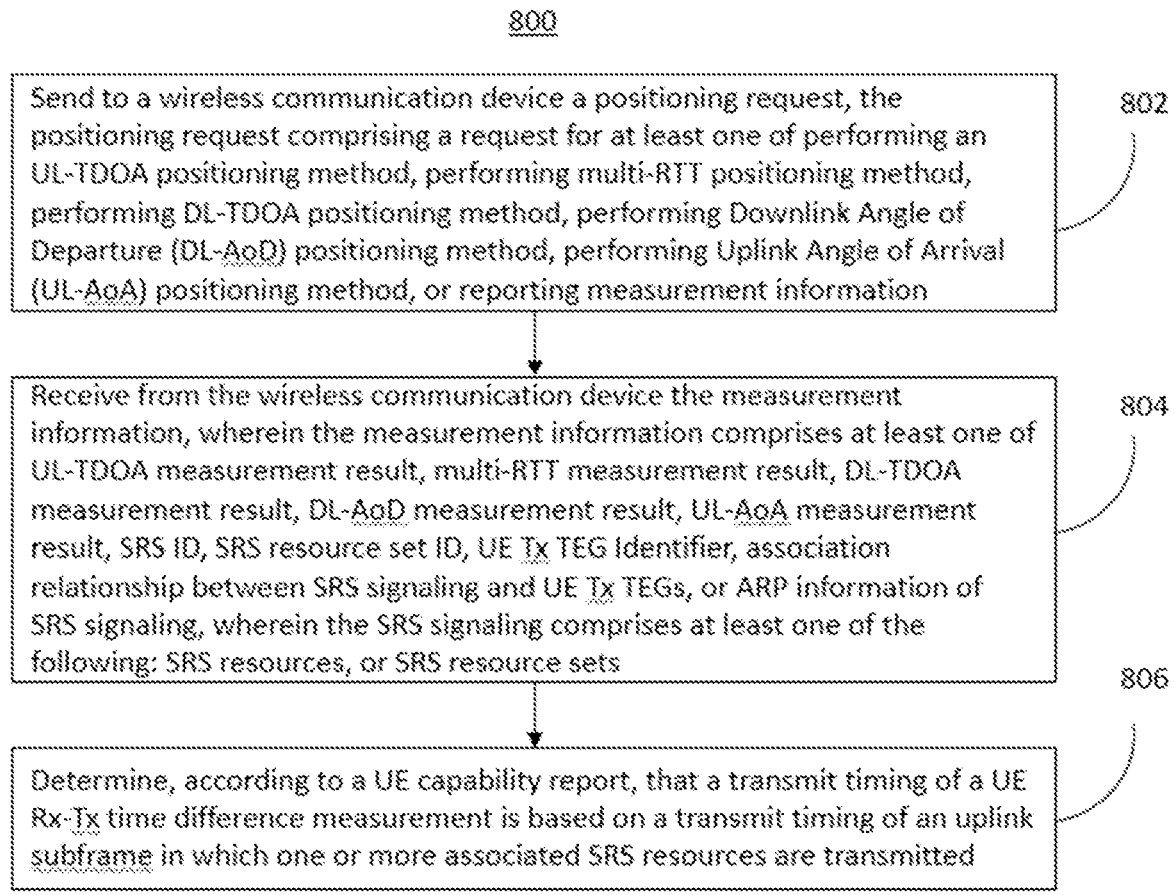

FIG. 8 illustrates a flow chart of an example wireless communication process 800, according to some embodiments. The process 800 is performed by the TRP. The process 800 includes sending to a wireless communication device a positioning request (802). The positioning request includes a request for at least one of performing an UL-TDOA positioning method, performing multi-RTT positioning method, performing DL-TDOA positioning method, performing DL-AoD positioning method, performing UL-AoA positioning method, or reporting measurement information. The process 800 also includes receiving from the wireless communication device the measurement information (804). The measurement information includes at least one of UL-TDOA measurement result, multi-RTT measurement result, DL-TDOA measurement result, DL-AoD measurement result, UL-AoA measurement result, SRS resource ID, SRS resource set ID, UE Tx TEG ID, association relationship between SRS signaling and UE Tx TEGs, or ARP information of SRS signaling. The SRS signaling includes at least one of the following: SRS resources, or SRS resource sets. The process 800 includes determining, according to a UE capability report, that a transmit timing of a UE Rx-Tx time difference measurement is based on a transmit timing of an uplink subframe in which one or more associated SRS resources are transmitted (806).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules. However, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication, comprising:
   receiving, by a wireless communication device from a network, a positioning request, wherein the positioning request comprises reporting measurement information and a period of reporting measurement information; and
   reporting, by the wireless communication device to the network, the measurement information in the period of reporting the measurement information, wherein the measurement information comprises an association relationship between sounding reference signal (SRS) resources and User Equipment (UE) Transmission (Tx) Timing Error Groups (TEGs), and
   a maximum number of additional reference signal time difference (RSTD) measurements for each transmission-reception point (TRP) pair for downlink time difference of arrival (DL-TDOA) is larger than 3; or
   a maximum number of additional Rx-Tx time difference measurements for each TRP pair for multi round trip time (RTT) is larger than 3.

2. The wireless communication method of claim 1, wherein a SRS signaling comprises the SRS resources.

3. The wireless communication method of claim 1, wherein a positioning reference signal (PRS) of a transmission-reception point (TRP) is received by different UE reception (Rx) TEGs.

4. A wireless communication method, comprising:
   sending, by a network to a wireless communication device, a positioning request, wherein the positioning request comprises reporting measurement information and a period of reporting measurement information; and
   receiving, by the network from the wireless communication device, the measurement information in the period of reporting the measurement information, wherein the measurement information comprises an association relationship between sounding reference signal (SRS) resources and User Equipment (UE) Transmission (Tx) Timing Error Groups (TEGs), wherein
   a maximum number of additional reference signal time difference (RSTD) measurements for each transmission-reception point (TRP) pair for downlink time difference of arrival (DL-TDOA) is larger than 3; or
   a maximum number of additional Rx-Tx time difference measurements for each TRP pair for multi round trip time (RTT) is larger than 3.

5. The wireless communication method of claim 4, wherein a SRS signaling comprises the SRS resources.

6. The method of claim 4, wherein a positioning reference signal (PRS) of a transmission-reception point (TRP) is received by different UE reception (Rx) TEGs.

7. A wireless communication device, comprising:
   at least one processor configured to:
   receive, via a transceiver from a network, a positioning request, wherein the positioning request comprises reporting measurement information and a period of reporting measurement information; and
   report, via the transceiver to the network, the measurement information in the period of reporting the measurement information, wherein the measurement information comprises an association relationship between sounding reference signal (SRS) resources and User Equipment (UE) Transmission (Tx) Timing Error Groups (TEGs), wherein
   a maximum number of additional reference signal time difference (RSTD) measurements for each transmission-reception point (TRP) pair for downlink time difference of arrival (DL-TDOA) is larger than 3; or
   a maximum number of additional Rx-Tx time difference measurements for each TRP pair for multi round trip time (RTT) is larger than 3.

8. The wireless communication device of claim 7, wherein a SRS signaling comprises the SRS resources.

9. The wireless communication device of claim 7, wherein a positioning reference signal (PRS) of a transmission-reception point (TRP) is received by different UE reception (Rx) TEGs.

10. A network node, comprising:
at least one processor configured to:
- send, via a transceiver to a wireless communication device, a positioning request, wherein the positioning request comprises reporting measurement information and a period of reporting measurement information; and
- receive, via the transceiver from the wireless communication device, the measurement information in the period of reporting the measurement information, wherein the measurement information comprises an association relationship between sounding reference signal (SRS) resources and User Equipment (UE) Transmission (Tx) Timing Error Groups (TEGs), wherein
  - a maximum number of additional reference signal time difference (RSTD measurements for each transmission-reception point (TRP) pair for downlink time difference of arrival (DL-TDOA) is larger than 3; or
  - a maximum number of additional Rx-Tx time difference measurements for each TRP pair for multi round trip time (RTT) is larger than 3.

11. The network node of claim 10, wherein a SRS signaling comprises the SRS resources.

12. The network node of claim 10, wherein a positioning reference signal (PRS) of a transmission-reception point (TRP) is received by different UE reception (Rx) TEGs.

* * * * *